US011954752B2

(12) United States Patent
Yan

(10) Patent No.: US 11,954,752 B2
(45) Date of Patent: Apr. 9, 2024

(54) GOODS TRANSPORTATION CONTROL SYSTEM AND RELATED SYSTEMS AND APPARATUSES

(71) Applicant: BEIJING TUSEN ZHITU TECHNOLOGY CO., LTD., Beijing (CN)

(72) Inventor: Chao Yan, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 535 days.

(21) Appl. No.: 16/677,479

(22) Filed: Nov. 7, 2019

(65) Prior Publication Data
US 2020/0143502 A1    May 7, 2020

(30) Foreign Application Priority Data

Nov. 7, 2018    (CN) .......................... 201811320105.X

(51) Int. Cl.
*G06Q 50/28*    (2012.01)
*G05D 1/00*    (2006.01)
(Continued)

(52) U.S. Cl.
CPC ........... *G06Q 50/28* (2013.01); *G05D 1/0212* (2013.01); *G05D 1/0282* (2013.01);
(Continued)

(58) Field of Classification Search
CPC .. G06Q 50/28; G06Q 10/1097; G05D 1/0212; G05D 1/0282; G05D 2201/0216; B66C 1/00; B65G 1/00
See application file for complete search history.

(56) References Cited

U.S. PATENT DOCUMENTS 9,909,864 B2 *   3/2018   Engedal ................. B66D 1/525
2003/0167214 A1 *  9/2003   Kang .................. G06Q 10/0875
                                                        705/29
(Continued)

FOREIGN PATENT DOCUMENTS

CN     104555473 A     4/2015
CN     105913208 A     8/2016
(Continued)

OTHER PUBLICATIONS

Thurston, Tom, and Huosheng Hu. "Distributed agent architecture for port automation." Proceedings 26th Annual International Computer Software and Applications. IEEE, 2002. (Year: 2002).*

(Continued)

*Primary Examiner* — Hamzeh Obaid
(74) *Attorney, Agent, or Firm* — Perkins Coie LLP

(57) ABSTRACT

The present disclosure provides a goods transportation control system and related systems and apparatuses, capable of achieving automated storage, distribution and transportation of containers in ship loading and unloading operations at a port. The goods transportation control system includes: a scheduling system configured to generate a container loading task and a container storage task based on a ship unloading plan, and transmit the container loading task and the container storage task to a vehicle control system of a transportation vehicle and a warehouse management system of a warehouse center, respectively; the vehicle control system configured to control, upon receiving the container loading task, the transportation vehicle to move from a current location to a container loading location in the container loading task for loading a container, and to control, upon receiving a container unloading task, the transportation vehicle to move from the current location to a container unloading location in the container unloading task for unloading a container; and the warehouse management (Continued)

system configured to assign, upon receiving the container storage task, a warehouse hoisting apparatus to hoist each target container carried by the transportation vehicle to a corresponding storage location in accordance with the container storage task.

13 Claims, 2 Drawing Sheets

(51) Int. Cl.
    *G06Q 10/0631*     (2023.01)
    *G06Q 10/1093*     (2023.01)

(52) U.S. Cl.
    CPC ..... *G06Q 10/0631* (2013.01); *G06Q 10/1097* (2013.01); *G05D 2201/0216* (2013.01)

(56) References Cited

U.S. PATENT DOCUMENTS

| | | | | |
|---|---|---|---|---|
| 2008/0252417 | A1* | 10/2008 | Thomas | G06Q 10/08 340/10.1 |
| 2011/0163159 | A1* | 7/2011 | Thomas | G06Q 10/08 235/384 |
| 2015/0074011 | A1* | 3/2015 | Hariharan | G06Q 10/0833 705/333 |
| 2015/0112476 | A1* | 4/2015 | Torson | G06Q 10/047 700/214 |
| 2016/0009531 | A1* | 1/2016 | Saliba | B66C 19/007 701/19 |
| 2017/0109673 | A1* | 4/2017 | Bell | G06Q 50/28 |
| 2017/0245095 | A1* | 8/2017 | Neves | H04B 1/3822 |
| 2017/0316379 | A1* | 11/2017 | Lepek | G06Q 10/08 |

FOREIGN PATENT DOCUMENTS

| | | | |
|---|---|---|---|
| CN | 107273954 A | 10/2017 | |
| CN | 108469749 A | 8/2018 | |
| KR | 20100078837 | * 12/2018 | |
| WO | WO-2018208046 A2 | * 11/2018 | G01S 1/68 |

OTHER PUBLICATIONS

Davalos, Patricio Javier Cruz. Exploiting Heterogeneity in Networks of Aerial and Ground Robotic Agents. The University of New Mexico, 2016. (Year: 2016).*
Park, Dongyoon, et al. "Container chassis alignment and measurement based on vision for loading and unloading containers automatically." 2006 International Conference on Hybrid Information Technology. vol. 2. IEEE, 2006. (Year: 2006).*
China Patent Office, 1st Office Action for CN Appl. No. 201910057727. 6, dated Jun. 25, 2023, 50 pages with English translation.
Yi, Dang, et al., "Research on balanced scheduling of quayside-yard operation in automated container terminal," Journal of Jiaotong University (Natural Science Edition), Jul. 2018, vol. 37 N, Shanghai, China.
Office Action from corresponding related Chinese Patent Application No. 201910057727.6, dated Jan. 30, 2024, (42 pages).

* cited by examiner

GOODS TRANSPORTATION CONTROL SYSTEM AND RELATED SYSTEMS AND APPARATUSES

CROSS-REFERENCE TO RELATED APPLICATION(S)

This patent document claims the benefit of priority of Chinese Patent Application No. 201811320105.X, filed Nov. 7, 2018. The entire content of the before-mentioned patent application is incorporated by reference as part of the disclosure of this application.

TECHNICAL FIELD

The present disclosure relates to intelligent control technology, and more particularly, to a goods transportation control system and related systems and apparatuses.

BACKGROUND

As a hub station for waterway-land coordinated transportation, a port is a buffer for conversion of transportation schemes of containerized goods, and plays an important role in the whole container transportation process. At the port, container transportation operations such as container unloading and container loading are required for inbound and outbound containers.

The process of container unloading is generally as follows. After a ship arrives at a port, a container is first moved onto a transportation vehicle by a shore crane (or shore bridge). Then, the container is transported by the transport vehicle to a yard (or warehouse center). Finally, the container on the transportation vehicle is placed at a corresponding location in the yard by a warehouse hoisting apparatus (such as a rail-mounted gantry crane, a rubber-tired gantry crane, a forklift, etc.) near the yard, thereby completing the ship unloading operation.

The process of container loading is generally as follows. A container in a yard is lifted and placed onto a transportation vehicle by a warehouse hoisting apparatus at the yard, and transported by the transportation vehicle to a shore crane where a ship is located. The container on the transportation vehicle is placed onto the ship by the shore crane, thereby completing the ship loading operation.

SUMMARY

In an aspect, a goods transportation control system is provided according to an embodiment of the present disclosure. The goods transportation control system includes: a scheduling system configured to generate a container loading task and a container storage task based on a ship unloading plan, and transmit the container loading task and the container storage task to a vehicle control system of a transportation vehicle and a warehouse management system of a warehouse center, respectively; the vehicle control system configured to control, upon receiving the container loading task, the transportation vehicle to move from a current location to a container loading location in the container loading task for loading a container, and to control, upon receiving a container unloading task, the transportation vehicle to move from the current location to a container unloading location in the container unloading task for unloading a container; and the warehouse management system configured to assign, upon receiving the container storage task, a warehouse hoisting apparatus to hoist each target container carried by the transportation vehicle to a corresponding storage location in accordance with the container storage task.

In another aspect, a scheduling system is provided according to an embodiment of the present disclosure. The scheduling system includes at least one machine executable instruction. The at least one machine executable instruction includes a scheduling communication module and a scheduling task generation module. The at least one machine executable instruction is executed by a processor such that: the scheduling communication module is configured to transmit and receive information, and the scheduling task generation module is configured to generate a container loading task and a container storage task based on a ship unloading plan, and transmit the container loading task and the container storage task to a vehicle control system of a transportation vehicle and a warehouse management system of a warehouse center, respectively, via the scheduling communication module.

In another aspect, a scheduling system is provided according to an embodiment of the present disclosure. The scheduling system includes at least one processor and at least one memory. The at least one memory stores any of the above scheduling systems executable by the at least one processor.

In another aspect, a shore crane apparatus is provided according to an embodiment of the present disclosure. The shore crane apparatus includes the above scheduling system.

In another aspect, a vehicle control system is provided according to an embodiment of the present disclosure. The vehicle control system includes at least one machine executable instruction. The at least one machine executable instruction includes a vehicle communication module and a vehicle control module. The at least one machine executable instruction is executed by a processor such that: the vehicle communication module is configured to transmit and receive information, and the vehicle control module is configured to control, upon receiving a container loading task via the vehicle communication module, a transportation vehicle to move from a current location to a container loading location in the container loading task for loading a container, and to control, upon receiving a container unloading task via the vehicle communication module, the transportation vehicle to move from the current location to a container unloading location in the container unloading task for unloading a container.

In another aspect, a vehicle control system is provided according to an embodiment of the present disclosure. The vehicle control system includes at least one processor and at least one memory. The at least one memory stores the above vehicle control system executable by the at least one processor.

In another aspect, a transportation vehicle is provided according to an embodiment of the present disclosure. The transportation vehicle includes the above vehicle control system.

In another aspect, a goods transportation control system is provided according to an embodiment of the present disclosure. The goods transportation control system includes: a scheduling system configured to generate a container transportation task and a container distribution task based on a ship loading plan, and transmit the container transportation task and the container distribution task to a vehicle control system of a transportation vehicle and a warehouse management system of a warehouse center, respectively; the vehicle control system configured to control, upon receiving the container transportation task, the transportation vehicle to move to a container loading location associated with the container transportation task for loading a container, and to control, when completing the loading of the container, the transportation vehicle to move to a container unloading location associated with the container transportation task for unloading the container; and the warehouse management system configured to assign, upon receiving the container distribution task, a warehouse hoisting apparatus to hoist a target container in the container distribution task onto the transportation vehicle In another aspect, a scheduling system is provided according to an embodiment of the present disclosure. The scheduling system includes at least one machine executable instruction. The at least one machine executable instruction includes a scheduling communication module and a scheduling task generation module. The at least one machine executable instruction is executed by a processor such that: the scheduling communication module is configured to transmit and receive information, and the scheduling task generation module is configured to generate a container transportation task and a container distribution task based on a ship loading plan, and transmit the container transportation task and the container distribution task to a vehicle control system of a transportation vehicle and a warehouse management system of a warehouse center, respectively, via the scheduling communication module.

In another aspect, a scheduling system is provided according to an embodiment of the present disclosure. The scheduling system includes at least one processor and at least one memory. The at least one memory stores the above scheduling system executable by the at least one processor.

In another aspect, a vehicle control system is provided according to an embodiment of the present disclosure. The vehicle control system includes at least one machine executable instruction. The at least one machine executable instruction includes a vehicle communication module and a vehicle control module. The at least one machine executable instruction is executed by a processor such that: the vehicle communication module is configured to transmit and receive information, and the vehicle control module is configured to control, upon receiving the container transportation task via the vehicle communication module, a transportation vehicle to move to a container loading location associated with the container transportation task for loading a container, and to control, when completing the loading of the container, the transportation vehicle to move to a container unloading location associated with the container transportation task for unloading the container.

In another aspect, a vehicle control system is provided according to an embodiment of the present disclosure. The vehicle control system includes at least one processor and at least one memory. The at least one memory stores the above vehicle control system executable by the at least one processor.

In another aspect, a transportation vehicle is provided according to an embodiment of the present disclosure. The transportation vehicle includes the above vehicle control system.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in further detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, exemplary embodiments of the present disclosure will be described in further detail with reference to the figures. While the exemplary embodiments of the present disclosure are shown in the figures, it is to be noted that the present disclosure can be implemented in various forms and are not limited to the embodiments described below. Rather, these embodiments are provided to facilitate a more thorough understanding of the present disclosure and to convey the scope of the present disclosure fully to those skilled in the art.

Conventionally at a port, the above container transportation operations such as loading and unloading require human intervention. For example, ships need to be steered and controlled by humans to berth at specified locations. Hoisting apparatus and transportation vehicles need to be driven and operated by operators to perform operations such as container loading, container unloading and transportation. Yards or warehouse centers also need human intervention to arrange locations at which containers are to be placed. Thus, the conventional container transportation operations at the port have low level of intelligence and require a large amount of human resources, resulting in a low operation efficiency. Further, due to the complicated environment in the field, it is difficult to guarantee the safety of the operators. Moreover, the labor cost is relatively high as a large number of operators are required.

With the goods transportation control system according to the embodiment of the present disclosure, for an operation of loading/unloading a container onto/from a ship at a port, in order to achieve automated storage, distribution and transportation of containers, a scheduling system, a warehouse management system and a vehicle control system exchange information with each other, so as to achieve fully automated, unmanned container transportation at the port, thereby improving the intelligence level of the transportation operations at the port, reducing requirements on human resources and labor cost, improving operation efficiency and avoiding the problem associated with lack of safety guarantee for operators.

Figure 1:
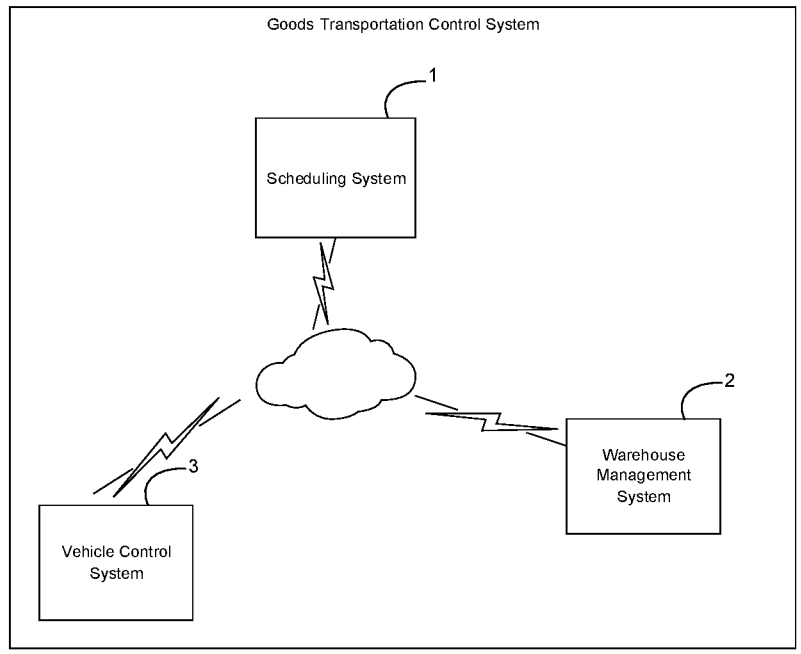
FIG. 1 is a schematic diagram showing a structure of a goods transportation control system according to an embodiment of the present disclosure.

A goods transportation control system is provided according to an embodiment of the present disclosure. Referring to FIG. 1, the goods transportation control system includes a scheduling system 1, a warehouse management system 2 provided at a warehouse center, and a vehicle control system 3 provided at a transportation vehicle.

The scheduling system 1 is configured to generate a container loading task and a container storage task based on a ship unloading plan, and transmit the container loading task and the container storage task to the vehicle control system 3 of the transportation vehicle and the warehouse management system 2 of the warehouse center, respectively (i.e., the scheduling system 1 transmits the container loading task to the vehicle control system 3 of the transportation vehicle and transmits the container storage task to the warehouse management system 2).

The warehouse management system 2 is configured to assign, upon receiving the container storage task, a warehouse hoisting apparatus to hoist each target container carried by the transportation vehicle to a corresponding storage location in accordance with the container storage task.

The vehicle control system 3 is configured to control, upon receiving the container loading task, the transportation vehicle to move from a current location to a container loading location in the container loading task for loading a container, and to control, upon receiving a container unloading task, the transportation vehicle to move from the current location to a container unloading location in the container unloading task for unloading a container.

In some optional embodiments, the scheduling system 1 can be further configured to: determine, after a shore crane apparatus loads a container onto the transportation vehicle, the container unloading location based on a target container area of the container and generate the container unloading task containing the container unloading location; and transmit the container unloading task to the vehicle control system 3 of the transportation vehicle.

In some embodiments, in the port area, a container loading location and a container unloading location, which may be one and the same location or two different locations, can be predetermined for each container area. The container loading and unloading locations corresponding to each container area in the port area can be stored in advance in the scheduling system.

In some optional embodiments, the vehicle control system 3 can be further configured to: transmit a container loading in-position notification message to a shore crane control system of a shore crane apparatus corresponding to the container loading location when controlling the transportation vehicle to move to the container loading location; and transmit a container unloading in-position notification message to a warehouse management system corresponding to the container unloading location when controlling the transportation vehicle to move to the container unloading location.

In some optional embodiments, the warehouse management system 2 can be configured to confirm, upon receiving the container unloading in-position notification message, an identity of each container on the transportation vehicle, and assign the warehouse hoisting apparatus to hoist each target container carried by the transportation vehicle to the corresponding storage location when its identity is confirmed.

In some optional embodiments, a tag containing the identification information of the container can be provided at the surface of the container. For example, the tag can be a Quick Response (QR) code or a barcode, and the warehouse management system 2 can confirm the identity of the container on the transportation vehicle by recognizing the QR code or barcode on the container.

In an embodiment, the warehouse management system 2 can include an identity recognition device, which can be a camera, a code reader or any other device capable of recognizing a QR code or barcode (the present disclosure is not limited thereto). As an implementation of the embodiment of the present disclosure, the identity recognition device can be provided at or near the container loading and unloading locations corresponding to each container area and can obtain the identification information of the container by scanning the QR code or barcode on the container. The warehouse management system 2 can compare the identification information of the container with the identification information of the container in the container storage task, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the container storage task, and determining that the identity is confirmed when they match each other, or otherwise determining that the confirmation of the identity fails.

In some optional embodiments, when transmitting the container storage task to the warehouse center, the scheduling system 1 can determine, based on operation time information of each warehouse hoisting apparatus in the warehouse hoisting apparatus information in the port area, at least one warehouse hoisting apparatus that is in the idle state at predetermined hoisting time, and select one or more warehouse hoisting apparatuses from the determined at least one warehouse hoisting apparatus for assigning to the warehouse center. The predetermined hoisting time can be the ship unloading start time or the time at which the transportation vehicle is estimated to arrive at the warehouse center. Of course, in some optional embodiments, the warehouse center of the port has a pre-assigned corresponding warehouse hoisting apparatus and there is no need for the scheduling system 1 to assign the warehouse hoisting apparatus.

In an embodiment of the present disclosure, the storage area of the warehouse center can be divided into a number of container areas depending on the types of container goods they can store. The containers in each container area are stacked in layers per column. The container storage task transmitted from the scheduling system 1 to the warehouse management system 2 of the warehouse center may contain the identification information of the container and the target container area for the container. Upon receiving the container unloading in-position notification message from the vehicle control system 3 of the transportation vehicle, the warehouse management system 2 can obtain the identification information of the container on the transportation vehicle, compare the identification information of the container with the identification information of the container in the container storage task, and determine that the identity is confirmed when they match each other. In this case, the warehouse management system 2 can confirm the storage location of the container from available storage locations in the target container area based on the target container area for the container in the container storage task, generate the container unloading hoisting task containing the storage location of the container, and transmit the container unloading hoisting task to the hoisting control system of the warehouse hoisting apparatus. If they do not match, no further operation is performed and a warning message of leaving or wrong container area can be transmitted to the vehicle control system 3 of the transportation vehicle.

In an optional embodiment, the warehouse hoisting apparatus can be a rubber-tired gantry crane, a rail-mounted gantry crane or a forklift. The warehouse hoisting apparatus is provided with a hoisting arm, which can be a mechanical arm or a hoister (the present disclosure is not limited thereto). In an embodiment of the present disclosure, the hoisting arm can be a hoister. A lock can be provided at each of four corners of a lower part of the hoister (i.e., the four locks constitute the end effector). A lock hole coordinated with the lock is provided at each of four corners of the top of the container (i.e., the four lock holes constitute the grab section). When the four locks of the hoister are inserted into the four lock holes on the containers, the hoister can lift the container. Of course, in some other examples, the hoisting arm can be a hoister having a hook provided at its lower part (i.e., the hook constitutes the end effector). A buckle or ring can be provided on the top of the container. When the hook of the hoister is hooked to the buckle or ring on the top of the container, the hoister can lift the container.

In some optional embodiments, the warehouse management system 2 can be further configured to: mark each container in the container storage task as in a stored state upon receiving a container unloading completion notification message from the hoisting control system of the warehouse hoisting apparatus; and transmit a container storage task completion notification message to the scheduling system 1 when determining that all containers in the container storage task have been marked as in the stored state.

In some optional embodiments, the container storage task can include a container storage task list recording identification information of the warehouse management system, the identification information of each container to be stored in the warehouse center and its corresponding target container area.

In an embodiment of the present disclosure, a warehouse management system can manage one or more container areas. If the target container areas for the containers in the ship unloading plan are distributed across a plurality of warehouse management systems, the scheduling system can generate a plurality of container storage tasks based on the ship unloading plan and transmit them to the respective warehouse management systems. Assuming that one warehouse management system manages one container area and the target container areas for a number, N, of containers in a ship unloading plan are distributed over Container Area A, Container Area B, Container Area C and Container Area D managed by Warehouse Management Systems A~D, respectively, the scheduling system can generate four container storage tasks, with the containers in each container storage task having the same target container area, and transmit the four container storage tasks to Warehouse Management Systems A~D, respectively.

In an embodiment, the scheduling system 1, the warehouse management system 2 and the vehicle control system 3 can communicate with each other by means of wireless communication. The wireless communication can be Narrow Band Internet of Things (NB-IoT), 4G, WIFI, Zigbee or the like, and the present disclosure is not limited thereto.

In an embodiment of the present disclosure, the scheduling system 1 can be a cloud server provided at a port area or a shore crane control system provided on a shore crane apparatus. Two specific examples will be given below for detailed description.

Example 1

In Example 1, the scheduling system 1 can be a cloud server provided at a port area. The scheduling system 1 can be further configured to generate a ship unloading plan based on ship information and container information of a target ship and shore crane apparatus information.

In some optional embodiments, the ship information may include ship arrival time and ship state information. The shore crane apparatus information may include operation time information of each shore crane apparatus in a port area. The container information may include a number of containers and identification information and a type of goods carried by each container. The ship information and the container information can be transmitted from the ship control system of the target ship to the scheduling system 1. The shore crane apparatus information may be information pre-stored in the scheduling system 1. Alternatively, each shore crane apparatus in the port area can transmit its own shore crane apparatus information to the scheduling system 1.

The scheduling system 1 generating the ship unloading plan based on the ship information and container information of the target ship and the shore crane apparatus information may include: determining the target shore crane apparatus based on the ship arrival time and the operation time information of each shore crane apparatus in the shore crane apparatus information; estimating ship unloading start time and ship unloading end time based on the ship arrival time, the operation time information of the target shore crane apparatus and the number of containers, and determining a target container area for each container based on the type of goods carried by the container and information on container areas in the port area; and generating the ship unloading plan containing identification information of the target ship, identification information of the target shore crane apparatus, the ship unloading start time, the ship unloading end time and the identification information and the target container area for each container.

In an embodiment, the ship unloading start time can be determined by: determining whether the target shore crane apparatus is in an idle state at the ship arrival time based on the operation time of the target shore crane apparatus; and if so, determining the ship arrival time or the time at which the ship has arrived and berthed as the ship unloading start time, or otherwise determining the time at which the target shore crane apparatus completes the task it is performing at the ship arrival time as the ship unloading start time.

In an embodiment, the ship unloading end time can be determined by: calculating a time length required for the target shore crane apparatus to unload all containers on the target ship to be unloaded at the port based on a historical operation rate of the target shore crane apparatus; and obtaining the ship unloading end time based on the ship unloading start time and the time length.

As an implementation of the embodiment of the present disclosure, the scheduling system 1 determining the target shore crane apparatus based on the ship arrival time and the operation time information of each shore crane apparatus in the shore crane apparatus information may include: determining one or more shore crane apparatuses available at the ship arrival time based on the ship arrival time and the operation time information of each shore crane apparatus;

and selecting one of the determined one or more shore crane apparatuses as the target shore crane apparatus. The available shore crane apparatus may refer to a shore crane apparatus that is in an idle state at the arrival time of the target ship, or a shore crane apparatus that is about to complete its operation task at the arrival time of the target ship.

As an implementation of the embodiment of the present disclosure, when determining the target shore crane apparatus based on the ship arrival time and the operation time information of each shore crane apparatus in the shore crane apparatus information, if the operation area of the target ship is enough for two or more shore crane apparatuses to perform hoisting operations, the scheduling system 1 can select two or more of the shore crane apparatuses in the idle state based on size information and the operation area of the ship, as target shore crane apparatuses. In the ship unloading operation, different target shore crane apparatuses can hoist containers within their respective operation ranges in accordance with the ship unloading task and load the containers onto transportation vehicles, so as to shorten the operation time and improve the operation efficiency.

As an implementation of the embodiment of the present disclosure, during the ship unloading process, if the currently determined target shore crane apparatus cannot meet a container hoisting requirement, e.g., when the currently determined target shore crane apparatus malfunctions during the hoisting operation, the scheduling system 1 can reselect another available hoisting apparatus as a new target shore crane apparatus based on current time information and the operation time information of each shore crane apparatus in the shore crane apparatus information.

As an optional implementation of the embodiment of the present disclosure, the scheduling system 1 can determine the target container area for each container based on the type of goods carried by the container and the information on container areas in the port area as follows. The warehouse center in the port area can be divided into different container areas depending on the types of goods they can store. The scheduling system 1 can obtain the type of goods carried by the container and determine the target container area in the warehouse center for storing the type of goods to store the container unloaded from the ship based on information on the types of goods each container area in the warehouse center of the port area can store.

Example 2

In Example 2, the scheduling system 1 can be a shore crane control system provided on a shore crane apparatus. The scheduling system 1 can be further configured to receive a ship unloading plan from a cloud server; and control, upon receiving a ship in-position notification message from a ship control system, a target shore crane apparatus to load a container on a target ship onto a transportation vehicle in accordance with the ship unloading plan.

In some optional embodiments, the scheduling system 1 controlling the target shore crane apparatus to load the container on the target ship onto the transportation vehicle in accordance with the ship unloading plan may include: confirming an identity of the container on the target ship and controlling the target shore crane apparatus to hoist the container when the identity is confirmed; and controlling the target shore crane apparatus to load the container onto the transportation vehicle upon receiving a vehicle in-position notification message from the vehicle control system 3 of the transportation vehicle.

The scheduling system 1 can confirm the identities of the containers on the target ship in a predetermined container unloading order and control the target shore crane apparatus to hoist each container when its identity is confirmed. Upon receiving the vehicle in-position notification message from the vehicle control system 3 of the transportation vehicle, the scheduling system 1 can control the target shore crane apparatus to load the container onto the transportation vehicle, mark in the ship unloading task the container as in an unloaded state, and transmit a ship unloading completion notification message to the ship control system of the target ship when it is determined that all containers in the ship unloading task are in the unloaded state.

In particular, the containers on the target ship can be arranged in columns, with multiple containers being stacked in layers in each column. The predetermined container unloading order can be obtained as follows. The scheduling system 1 can determine the location of each container to be unloaded on the ship based on the ship information and container information in the ship unloading plan, and generate a container unloading order in which the containers are unloaded by columns, from top to bottom per column, based on the number of containers to be unloaded and the identification information of each of the containers.

In some optional embodiments, the scheduling system 1 can be further configured to, when the confirmation of the identity fails, lift and place the container on top of another column of containers whose identities have been confirmed on the target ship.

In an embodiment, when the scheduling system 1 is controlling the shore crane apparatus to unload the containers on the ship, the containers on the target ship can be unloaded by columns, layer by layer from top to bottom per column (the containers are unloaded one column after another). When the hoisting process begins, the scheduling system 1 can confirm an identity of a container on the ship based on the identification information of the container in the ship unloading plan, control the target shore crane apparatus to lift the container when the identity is confirmed, and upon receiving the vehicle in-position notification message from the vehicle control system 3 of the transportation vehicle, control the target shore crane apparatus to load the container onto the transportation vehicle and mark the container in the ship unloading plan as in the unloaded state.

In an embodiment of the present disclosure, different contains carried by the target ship may have different destination ports and only some of the containers need to be unloaded at the target port. Thus, when unloading the container, it is required to re-arrange the container not to be unloaded at the target port on the target ship. In order to reduce the workload of the shore crane apparatus, the scheduling system 1 can confirm an identity of a container on the ship based on the identification information of the container in the ship unloading plan, and when the confirmation of the identity fails, control the target shore crane apparatus to lift and place the container on top of another column of containers whose identities have been confirmed on the target ship.

In an embodiment of the present disclosure, due to the limited operation area of the shore crane apparatus, in order to improve the operation efficiency, the scheduling system 1 can control the target shore crane apparatus to lift the container first, and while the container is in a lifted state, upon receiving the vehicle in-position notification message from the vehicle control system 3 of the transportation vehicle, load the container onto the transportation vehicle. After the container is loaded, the transportation vehicle leaves the container loading location immediately. The scheduling system 1 can control the target shore crane apparatus to lift the next container to be loaded and wait for the vehicle in-position notification for the next transportation vehicle. Each time a loading operation for a container has completed, the container in the ship unloading task is marked as in the unloaded state, until the ship unloading task is completed. When confirming that all containers in the ship unloading task are in the unloaded state, the scheduling system 1 can transmit a ship unloading completion notification message to the ship control system of the target ship.

In some optional embodiments, a tag containing the identification information of the container can be provided at the surface of the container. For example, the tag can be a Quick Response (QR) code or a barcode, and the scheduling system 1 can confirm the identity of the container on the target ship by recognizing the QR code or barcode on the container.

In an embodiment, the scheduling system 1 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoisting arm of the target shore crane apparatus and can obtain the identification information of the container by scanning the QR code or barcode on the container, compare the identification information of the container with the identification information of the container in the ship unloading plan, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the ship unloading plan, and determining that the identity is confirmed when they match each other, or otherwise determining that the confirmation of the identity fails.

Figure 2:
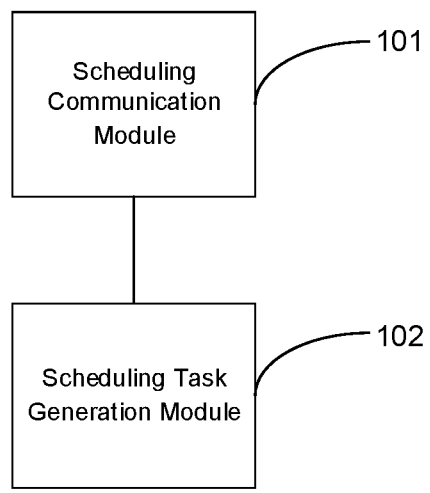
FIG. 2 is a first schematic diagram showing a structure of a scheduling system according to an embodiment of the present disclosure.

Based on the same inventive concept, according to an embodiment of the present disclosure, a scheduling system 1 is provided. Referring to FIG. 2, the scheduling system 1 includes at least one machine executable instruction. The at least one machine executable instruction includes a scheduling communication module 101 and a scheduling task generation module 102. The at least one machine executable instruction is executed by a processor such that: the scheduling communication module 101 is configured to transmit and receive information, and the scheduling task generation module 102 is configured to generate a container loading task and a container storage task based on a ship unloading plan, and transmit the container loading task and the container storage task to a vehicle control system 3 of a transportation vehicle and a warehouse management system 2 of a warehouse center, respectively, via the scheduling communication module 101 (the scheduling communication module 101 transmits the container loading task to the vehicle control system 3 of the transportation vehicle and transmits the container storage task to the shore crane control system of the warehouse management system 2).

In some optional embodiments, the scheduling communication module 101 can transmit and receive information using any of various communication protocols. The transmitted or received information can be transmitted or received via an antenna or transceiver coupled to the communication module 101.

The scheduling task generation module 102 can be further configured to determine, after a shore crane apparatus loads a container onto the transportation vehicle, a container unloading location based on a target container area of the container and generate a container unloading task containing the container unloading location; and transmit the container unloading task to the vehicle control system 3 of the transportation vehicle via the scheduling communication module 101.

Figure 3:
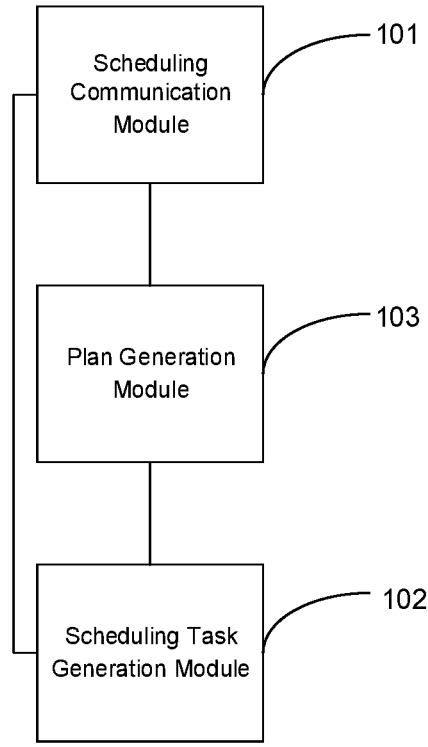
FIG. 3 is a second schematic diagram showing a structure of a scheduling system according to an embodiment of the present disclosure.

In some optional embodiments, referring to FIG. 3, the scheduling system 1 can further include a plan generation module 103 configured to generate a ship unloading plan based on ship information and container information of a target ship and shore crane apparatus information as received by the scheduling communication module 101.

Based on the same concept, according to an embodiment of the present disclosure, a scheduling system 1 is provided. The scheduling system 1 includes at least one processor and at least one memory. The at least one memory stores at least one machine executable instruction executable by the at least one processor. The at least one machine executable instruction includes the modules shown in FIG. 2 or 3. The at least one machine executable instruction can also provide modules for functions such as an operating system and a human-machine interaction interface. The at least one processor executes the at least one machine executable instruction to implement the above described operations, processes and functions of the scheduling system 1 as shown in FIG. 1.

Based on the same concept, according to an embodiment of the present disclosure, a shore crane apparatus is provided. The shore crane apparatus includes the above scheduling system 1 shown in FIG. 2 or 3. The shore crane apparatus can be a hoisting apparatus such as a shore bridge or an overhead crane. The scheduling system 1 can be provided in a control room of the shore crane apparatus. The control room may further include other systems, apparatuses and devices for controlling the shore crane apparatus. Alternatively, the scheduling system 1 can be provided at any other specified location on the shore crane apparatus. The scheduling system 1 can communicate with the other systems, apparatuses and devices in the control room, such that these systems, apparatuses and devices cooperate to control the operations of the shore crane apparatus.

Figure 4:
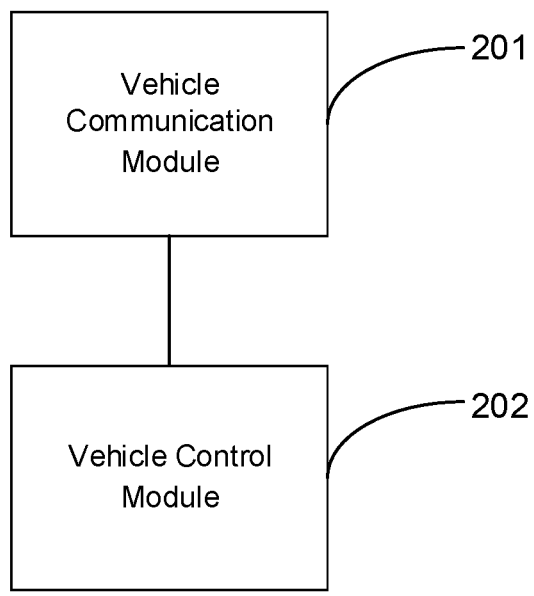
FIG. 4 is a schematic diagram showing a structure of a vehicle control system according to an embodiment of the present disclosure.

Based on the same application concept, according to an embodiment of the present disclosure, a vehicle control system 3 is provided. Referring to FIG. 4, the vehicle control system 3 includes at least one machine executable instruction. The at least one machine executable instruction includes a vehicle communication module 201 and a vehicle control module 202. The at least one machine executable instruction is executed by a processor such that: the vehicle communication module 201 is configured to transmit and receive information, and the vehicle control module 202 is configured to control, upon receiving a container loading task via the vehicle communication module 201, a transportation vehicle to move from a current location to a container loading location in the container loading task for loading a container, and to control, upon receiving a container unloading task via the vehicle communication module 201, the transportation vehicle to move from the current location to a container unloading location in the container unloading task for unloading a container.

In some optional embodiments, the vehicle communication module 201 can transmit and receive information using any of various communication protocols. The transmitted or received information can be transmitted or received via an antenna or transceiver coupled to the communication module 201.

In some optional embodiments, the vehicle control module 202 can be further configured to transmit a container loading in-position notification message to a shore crane control system of a shore crane apparatus corresponding to the container loading location via the vehicle communication module 201 when controlling the transportation vehicle to move to the container loading location, and transmit a container unloading in-position notification message to a warehouse management system corresponding to the container unloading location via the vehicle communication module 201 when controlling the transportation vehicle to move to the container unloading location.

Based on the same application concept, according to an embodiment of the present disclosure, a vehicle control system 3 is provided. The vehicle control system 3 includes at least one processor and at least one memory. The at least one memory stores at least one machine executable instruction executable by the at least one processor. The at least one machine executable instruction includes the modules shown in FIG. 4. The at least one machine executable instruction can also provide modules for functions such as an operating system and a human-machine interaction interface. The at least one processor executes the at least one machine executable instruction to implement the above described operations, processes and functions of the vehicle control system 3 as shown in FIG. 1.

Based on the same inventive concept, according to an embodiment of the present disclosure, a transportation vehicle is provided. The transportation vehicle includes the vehicle control system 3 according to the above embodiment. The transportation vehicle may further include other sensor systems, vehicle networking systems and control systems. The vehicle control system 3 can communicate with these systems so as to enable efficient navigation and safe travel of the vehicle.

Based on the same inventive concept as the above embodiments, according to an embodiment of the present disclosure, a goods transportation control system is provided. Referring to FIG. 1, the goods transportation control system includes:

a scheduling system 1 configured to generate a container transportation task and a container distribution task based on a ship loading plan, and transmit the container transportation task and the container distribution task to a vehicle control system 3 of a transportation vehicle and a warehouse management system 2 of a warehouse center, respectively (i.e., the scheduling system 1 transmits the container transportation task to the vehicle control system 3 of the transportation vehicle and transmits the container distribution task to the warehouse management system 2);

the vehicle control system 2 configured to control, upon receiving the container transportation task, the transportation vehicle to move to a container loading location associated with the container transportation task for loading a container, and to control, when completing the loading of the container, the transportation vehicle to move to a container unloading location associated with the container transportation task for unloading the container; and the warehouse management system 3 configured to assign, upon receiving the container distribution task, a warehouse hoisting apparatus to hoist a target container in the container distribution task onto the transportation vehicle.

In an embodiment of the present disclosure, a warehouse management system can manage one or more container areas. If the container areas in which the storages locations of the containers in the ship loading plan are located are distributed across a plurality of warehouse management systems, the scheduling system can generate a plurality of container distribution tasks based on the ship loading plan and transmit them to the respective warehouse management systems. Assuming that one warehouse management system manages one container area and the container areas corresponding to the storages locations of a number, M, of containers in a ship loading plan are distributed over Container Area A, Container Area B, Container Area C and Container Area D managed by Warehouse Management Systems A-D, respectively, the scheduling system can generate four container distribution tasks, with the containers in each container distribution task having the same target container area, and transmit the four container distribution tasks to Warehouse Management Systems A-D, respectively.

In some optional embodiments, the warehouse management system 2 assigning the warehouse hoisting apparatus to hoist the target container in the container distribution task onto the transportation vehicle may include the warehouse management system 2 transmitting a container loading hoisting task containing a storage location of the container to a hoisting control system of the warehouse hoisting apparatus based on a target container area for each container in the container distribution task; and marking the container in the container distribution task as in a distributed state upon receiving a container loading completion notification message from the hoisting control system of the warehouse hoisting apparatus, and transmitting a container distribution task completion notification message to the scheduling system when determining that all containers in the container distribution task have been marked as in the distributed state.

Upon receiving the container loading hoisting task, the hoisting control system of the warehouse hoisting apparatus can control the warehouse hoisting apparatus to lift the container at the storage location in the container loading hoisting task, load the container onto the transportation vehicle upon receiving a transportation vehicle in-position notification message, and transmit a container loading completion notification message to the warehouse management system 2 and/or the vehicle control system 3 of the transportation vehicle.

In some optional embodiments, the warehouse management system 2 can be further configured to: confirm the identity of the container at the container storage location in the container distribution task, and assign the warehouse hoisting apparatus to hoist the container onto the transportation vehicle when the identity is confirmed.

In some optional embodiments, a tag containing the identification information of the container can be provided at the surface of the container. For example, the tag can be a Quick Response (QR) code or a barcode, and the warehouse management system can confirm the identity of the container at the storage location by recognizing the QR code or barcode on the container.

In an embodiment, the warehouse management system 2 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoister of the warehouse hoisting apparatus and can obtain the identification information of the container by scanning the QR code or barcode on the container, compare the identification information of the container with the identification information of the container in the container distribution task, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the container distribution task, and determining that the identity is confirmed when they match each other, or otherwise determining that the confirmation of the identity fails.

In some optional embodiments, the vehicle control system 3 can be further configured to transmit a container loading in-position notification message to the warehouse management system 2 corresponding to the container loading location when controlling the transportation vehicle to move to the container loading location in the container transportation task. The warehouse management system 2 can transmit a transportation vehicle in-position notification message to the hoisting control system of the warehouse hoisting apparatus.

In some optional embodiments, the vehicle control system 3 can be further configured to transmit a container loading in-position notification message to the warehouse management system 2 corresponding to the container loading location when controlling the transportation vehicle to move to the container loading location in the container transportation task. The warehouse management system 2 can transmit the identification information of the warehouse hoisting apparatus to the vehicle control system 3. The vehicle control system 3 can transmit a transportation vehicle in-position notification message to the hoisting control system of the warehouse hoisting apparatus.

In some optional embodiments, the vehicle control system 3 can be further configured to transmit a transportation vehicle in-position notification message to the hoisting control system of the warehouse hoisting apparatus when controlling the transportation vehicle to move to the container loading location in the container transportation task.

In some optional embodiments, the vehicle control system 3 can be further configured to transmit a container unloading in-position notification message to the shore crane control system of the shore crane apparatus corresponding to the container unloading location when controlling the transportation vehicle to move to the container unloading location associated with the container transportation task.

In an embodiment of the present disclosure, the storage area of the warehouse center can be divided into a number of container areas depending on the types of container goods they can store. The containers in each container area are stacked in layers per column. The container distribution task transmitted from the scheduling system to the warehouse management system of the warehouse center may contain the identification information of the container and the storage location of the container.

In an embodiment, the hoisting control system of the warehouse hoisting apparatus can determine its own location information by means of positioning, exchange information with the warehouse management system and the vehicle control system to obtain the storage location information of the container and the location information of the transportation vehicle, and hoist the container on the transportation vehicle to the storage location of the container, or lift and load the container at the container storage location onto the transportation vehicle, based on its own location information, the storage location information of the container and the location information of the transportation vehicle.

In an embodiment, the warehouse hoisting apparatus can be a rubber-tired gantry crane, a rail-mounted gantry crane or a forklift. The warehouse hoisting apparatus is provided with a hoisting arm, which can be a mechanical arm or a hoister (the present disclosure is not limited thereto). In an embodiment of the present disclosure, the hoisting arm can be a hoister. A lock can be provided at each of four corners of a lower part of the hoister (i.e., the four locks constitute the end effector). A lock hole coordinated with the lock is provided at each of four corners of the top of the container (i.e., the four lock holes constitute the grab section). When the four locks of the hoister are inserted into the four lock holes on the containers, the hoister can lift the container. Of course, in some other examples, the hoisting arm can be a hoister having a hook provided at its lower part (i.e., the hook constitutes the end effector). A buckle or ring can be provided on the top of the container. When the hook of the hoister is hooked to the buckle or ring on the top of the container, the hoister can lift the container.

In some optional embodiments, the ship loading plan may contain the ship loading start time, the ship loading end time, the identification information of the target shore crane apparatus, the container unloading location corresponding to the target shore crane apparatus, the identification information of the target ship, the identification information of the warehouse management system, the identification information of the transportation vehicle, and the identification information and the storage location for each container.

The scheduling system 1 generating the container transportation task and the container distribution task based on the ship loading plan may include: the scheduling system 1 generating the container transportation task containing the container loading location and the container unloading location, and generating the container distribution task containing the ship loading start time, the ship loading end time, the identification information of the target shore crane apparatus, the identification information of the target ship, the identification information of the warehouse management system, and the identification information and the storage location for each container.

In an embodiment, the scheduling system 1, the warehouse management system 2 of the warehouse center, and the vehicle control system 3 can communicate with each other by means of wireless communication. The wireless communication can be Narrow Band Internet of Things (NB-IoT), 4G, WIFI, Zigbee or the like, and the present disclosure is not limited thereto.

In an embodiment of the present disclosure, the scheduling system 1 can be a cloud server provided at a port area or a shore crane control system provided on a shore crane apparatus. Two specific examples will be given below for detailed description.

Example 1

In Example 1, the scheduling system 1 can be a cloud server provided at a port area. The scheduling system 1 can be further configured to generate a ship loading plan based on ship information, container information and shore crane apparatus information.

In some optional embodiments, the ship information may include ship arrival time and ship state information. The shore crane apparatus information may include operation time information of each shore crane apparatus in a port area. The container information may include a number of containers and identification information and destination information of each container. The scheduling system 1 generating the ship loading plan based on the ship information, the container information, and the shore crane apparatus information may include: determining a storage location of each container based on the identification information of the container; determining a target ship based on the number of containers, the destination information of each container, the ship arrival time and ship state information of each ship in the ship information; determining the target shore crane apparatus based on the ship arrival time of the target ship and the operation time information of each shore crane apparatus in the shore crane apparatus information; estimating ship loading start time and ship loading end time based on the ship arrival time of the target ship, the operation time information of the target shore crane apparatus and the number of containers, and generating the ship loading plan containing identification information of the target ship, identification information of the target shore crane apparatus, the ship loading start time, the ship loading end time and the identification information and the storage location for each container.

In an embodiment, the ship loading start time can be determined by: determining whether the target shore crane apparatus is in an idle state at the ship arrival time based on the operation time of the target shore crane apparatus; and if so, determining the ship arrival time or the time at which the ship has arrived and berthed as the ship loading start time, or otherwise determining the time at which the target shore crane apparatus completes the task it is performing at the ship arrival time as the ship loading start time.

In an embodiment, the ship loading end time can be determined by: calculating a time length required for the target shore crane apparatus to load the container onto the target ship based on a historical operation rate of the target shore crane apparatus; and obtaining the ship loading end time based on the ship loading start time and the time length.

As an implementation of the embodiment of the present disclosure, the scheduling system 1 determining the target shore crane apparatus based on the ship arrival time of the target ship and the operation time information of each shore crane apparatus in the shore crane apparatus information may include: determining one or more shore crane apparatuses available at the ship arrival time based on the ship arrival time of the target ship and the operation time information of each shore crane apparatus; and selecting one of the determined one or more shore crane apparatuses as the target shore crane apparatus. The available shore crane apparatus may refer to a shore crane apparatus that is in an idle state at the arrival time, or a shore crane apparatus that is about to complete its operation at the arrival time.

As an implementation of the embodiment of the present disclosure, when determining the target shore crane apparatus based on the ship arrival time and the operation time information of each shore crane apparatus in the shore crane apparatus information, if the operation area of the target ship is enough for two or more shore crane apparatuses to perform hoisting operations, the scheduling system 1 can select two or more of the shore crane apparatuses in the idle state based on size information and the operation area of the ship, as target shore crane apparatuses. In the ship loading operation, different target shore crane apparatuses can hoist containers within their respective operation ranges in accordance with the ship loading task and load the containers onto the target ship, so as to shorten the operation time and improve the operation efficiency.

As an implementation of the embodiment of the present disclosure, during the ship loading process, if the currently determined target shore crane apparatus cannot meet a container hoisting requirement, e.g., when the currently determined target shore crane apparatus malfunctions during the hoisting operation, the scheduling system 1 can reselect another available hoisting apparatus as a new target shore crane apparatus based on current time information and the operation time information of each shore crane apparatus in the shore crane apparatus information.

Example 2

In Example 2, the scheduling system 1 can be a shore crane control system provided on a shore crane apparatus. The scheduling system 1 can be further configured to receive a ship unloading plan from a cloud server; and control, upon receiving a ship in-position notification message from a ship control system, a target shore crane apparatus to load a container on a transportation vehicle onto a target ship in accordance with the received ship loading task.

The scheduling system 1 controlling the target shore crane apparatus to load the container on the transportation vehicle onto the target ship in accordance with the received ship loading task may include: the scheduling system 1 confirming, upon receiving a vehicle in-position notification message from the vehicle control system 3 of the transportation vehicle, identification information of the container on the transportation vehicle, controlling the target shore crane apparatus to load the container on the transportation vehicle onto the target ship when the identification information is confirmed, and marking the container in the ship loading plan as in a loaded state; and the scheduling system 1 transmitting a ship loading completion notification message to the ship control system of the target ship when determining that all containers in the ship loading task have been marked as in the loaded state.

In particular, the containers on the target ship can be arranged in columns, with multiple containers being stacked in layers in each column. Upon receiving the vehicle in-position notification message from the vehicle control system 3, the scheduling system 1 can compare the container information in the ship loading task with the identification information of the container carried by the transportation vehicle, and when they match each other, determine that the identification information of the container carried by the transportation vehicle is confirmed, control the target shore crane apparatus to load the container on the transportation vehicle onto the target ship, and mark the container in the ship loading task as in the loaded state.

In some optional embodiments, a tag containing the identification information of the container can be provided at the surface of the container. For example, the tag can be a Quick Response (QR) code or a barcode, and the scheduling system 1 can confirm the identity of the container on the transportation vehicle by recognizing the QR code or barcode on the container.

In an embodiment, the scheduling system 1 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoisting arm of the target shore crane apparatus and can obtain the identification information of the container by scanning the QR code or barcode on the container, compare the identification information of the container with the identification information of the container in the ship loading plan, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the ship loading plan, and determining that the identity is confirmed when they match each other, or otherwise determining that the confirmation of the identity fails.

In an embodiment, when the scheduling system 1 is controlling the shore crane apparatus to hoist the containers onto the target ship, the containers to be loaded onto the target ship can be loaded by columns and stacked layer by layer per column (the containers are loaded one column of container loading areas after another).

In an embodiment of the present disclosure, when the containers are loaded onto the target ship for transportation, they can be loaded in different categories depending on their respective destination ports, so as to reduce the workload of hoisting operations when they arrive at their destinations and improve the operation efficiency.

In an embodiment, the scheduling system 1 can obtain its own location information by means of positioning, and exchange information with the ship control system and the vehicle control system, so as to obtain the location information of the target ship and the location information of the transportation vehicle, and hoist the container onto the target ship based on its own location information, the location information of the target ship and the location information of the transportation vehicle.

In an embodiment, the hoisting arm of the shore crane apparatus can be provided with an end effector, and the container can be provided with a grab section coordinated with the end effector. The shore crane apparatus lifts the container by grabbing the grab section of the container with the end effector.

In an embodiment, in a container lifting operation, the scheduling system can capture an image of the grab section of the container, determine orientation information of the grab section based on the image, and adjust a movement gesture of the end effector based on the orientation information of the grab section, such that the end effector can grab the grab section precisely to lift the container.

In an embodiment of the present disclosure, the hoisting arm can be a hoister. A lock can be provided at each of four corners of a lower part of the hoister (i.e., the four locks constitute the end effector). A lock hole coordinated with the lock is provided at each of four corners of the top of the container (i.e., the four lock holes constitute the grab section). When the four locks of the hoister are inserted into the four lock holes on the containers, the hoister can lift the container. Of course, in some other examples, the hoisting arm can be a hoister having a hook provided at its lower part (i.e., the hook constitutes the end effector). A buckle or ring can be provided on the top of the container. When the hook of the hoister is hooked to the buckle or ring on the top of the container, the hoister can lift the container.

Based on the same concept, according to an embodiment of the present disclosure, a scheduling system 1 is provided. Referring to FIG. 2, the scheduling system 1 includes at least one machine executable instruction. The at least one machine executable instruction includes a scheduling communication module 101 and a scheduling task generation module 102. The at least one machine executable instruction is executed by a processor such that: the scheduling communication module 101 is configured to transmit and receive information, and the scheduling task generation module 102 is configured to generate a container transportation task and a container distribution task based on a ship loading plan, and transmit the container transportation task and the container distribution task to a vehicle control system 3 of a transportation vehicle and a warehouse management system 2 of a warehouse center, respectively, via the scheduling communication module 101.

In some optional embodiments, the scheduling communication module 101 can transmit and receive information using any of various communication protocols. The transmitted or received information can be transmitted or received via an antenna or transceiver coupled to the communication module 101.

In some optional embodiments, referring to FIG. 3, the scheduling system 1 can further include a plan generation module 103 configured to determine the ship loading plan based on ship information, container information and shore crane apparatus information.

For details regarding how the plan generation module 103 generates the ship loading plan, reference can be made to the above description, which will not be repeated here.

Based on the same concept, according to an embodiment of the present disclosure, a scheduling system 1 is provided. The scheduling system 1 includes at least one processor and at least one memory. The at least one memory stores at least one machine executable instruction executable by the at least one processor. The at least one machine executable instruction includes the modules shown in FIG. 2. The at least one machine executable instruction can also provide modules for functions such as an operating system and a human-machine interaction interface. The at least one processor executes the at least one machine executable instruction to implement the above described operations, processes and functions of the scheduling system 1 as shown in FIG. 1.

Based on the same concept, according to an embodiment of the present disclosure, a shore crane apparatus is provided. The shore crane apparatus includes the above scheduling system 1. The shore crane apparatus can be a hoisting apparatus such as a shore bridge or an overhead crane. The scheduling system 1 can be provided in a control room of the shore crane apparatus. The control room may further include other systems, apparatuses and devices for controlling the shore crane apparatus. Alternatively, the scheduling system 1 can be provided at any other specified location on the shore crane apparatus. The scheduling system 1 can communicate with the other systems, apparatuses and devices in the control room, such that these systems, apparatuses and devices cooperate to control the operations of the shore crane apparatus.

Based on the same application concept, according to an embodiment of the present disclosure, a vehicle control system is provided. Referring to FIG. 4, the vehicle control system 3 includes at least one machine executable instruction. The at least one machine executable instruction includes a vehicle communication module 201 and a vehicle control module 202. The at least one machine executable instruction is executed by a processor such that: the vehicle communication module 201 is configured to transmit and receive information, and the vehicle control module 202 is configured to control, upon receiving the container transportation task via the vehicle communication module 201, a transportation vehicle to move to a container loading location associated with the container transportation task for loading a container, and to control, when completing the loading of the container, the transportation vehicle to move to a container unloading location associated with the container transportation task for unloading the container.

In some optional embodiments, the vehicle communication module 201 can transmit and receive information using any of various communication protocols. The transmitted or received information can be transmitted or received via an antenna or transceiver coupled to the communication module 201.

In some optional embodiments, the vehicle control module 202 can be further configured to: transmit a container loading in-position notification message to a warehouse management system 2 corresponding to the container loading location via the vehicle communication module when controlling the transportation vehicle to move to the container loading location.

Based on the same application concept, according to an embodiment of the present disclosure, a vehicle control system 3 is provided. The vehicle control system 3 includes at least one processor and at least one memory. The at least one memory stores at least one machine executable instruction executable by the at least one processor. The at least one machine executable instruction includes the modules shown in FIG. 4. The at least one machine executable instruction can also provide modules for functions such as an operating system and a human-machine interaction interface. The at least one processor executes the at least one machine executable instruction to implement the above described operations, processes and functions of the vehicle control system 3 as shown in FIG. 1.

Based on the same application concept, according to an embodiment of the present disclosure, a transportation vehicle is provided. The transportation vehicle includes the above vehicle control system. The transportation vehicle may further include other sensor systems, vehicle networking systems and control systems. The vehicle control system 3 can communicate with these systems so as to enable efficient navigation and safe travel of the vehicle.

Unless stated otherwise specifically, terms such as processing, calculating, operating, determining, displaying and the like may refer to an action and/or procedure performed by one or more processing or computing systems or similar devices. The action and/or procedure can be represented as a data operation on a physical (e.g., electronic) quantity in a register or memory of a processing system or a conversion into other data similarly represented as a physical quantity in a memory or register of a processing system or any other similar information storage, transmission or display device. Information or signals can be represented using any of various different techniques and methods. For example, the data, instructions, commands, information, signals, bits, symbols and chips mentioned throughout the above description can be represented using voltages, currents, electromagnetic waves, magnetic fields or particles, optical fields or particles, or any combination thereof.

It should be noted that any particular order or hierarchy of the steps in the disclosed process is only an example of an exemplary method. It can be appreciated that, depending on design preferences, the particular order or hierarchy of the steps in the disclosed process can be re-arranged without departing from the scope of the present disclosure. The method claims as attached show elements of the respective steps in an exemplary order, but they are not limited to the particular order or hierarchy as described.

In the above detailed description, various features may be combined together in one single embodiment for simplicity. However, such disclosure should not be interpreted as reflecting an intent that the implementation of the claimed subject matter requires more features than those clearly defined in each claim. Rather, as reflected by the claims as attached, the present disclosure may be in a state having less than all features of the one single embodiment as disclosed. Therefore, the claims are hereby explicitly incorporated into the detailed description and each claim individually constitutes a separate preferred embodiment of the present disclosure.

It can be appreciated by those skilled in the art that various illustrative logic blocks, modules, circuits and algorithm steps described in connection with the embodiments of the present disclosure can be implemented as electronic hardware, computer software or any combination thereof. In order to clearly illustrate the interchangeability between the hardware and the software, the illustrative components, blocks, modules, circuits and steps have been described above generally with respect to their functions. Depending on specific applications and design constraints applied to the entire system, the functions can be implemented in either hardware or software. For each specific application, those skilled in the art can implement the described function flexibly. However, such implementation decision should not be interpreted as departing from the scope of the present disclosure.

The steps of the methods or algorithms described in connection with the embodiments of the present disclosure can be embodied directly as hardware, software modules executable by processors or any combination thereof. The software modules can be provided in a RAM, a flash memory, a ROM, an EPROM, an EEPROM, a register, a hard drive, a removable magnetic drive, a CD-ROM or any other form of storage medium known in the art. An exemplary storage medium is connected to a processor, such that the processor can read information from the storage medium or write information into the storage medium. Of course, the storage medium can alternatively be a component of the processor. The processor and the storage medium can be provided in an ASIC. The ASIC can be in a user terminal. Of course, the processor and the storage medium can be provided as separate components in a user terminal.

For software implementations, the technique described in the present disclosure can be implemented using modules (e.g., processes, functions or the like) performing the functions described in the present disclosure. These software codes can be stored in a memory unit and executed by a processor. The memory unit can be provided within the processor or externally to the processor. In the latter case, it can be communicatively coupled to the processor in various ways known in the art.

The above description includes examples of one or more embodiments. Of course, it would be impossible to describe all possible combinations of components or methods in order to describe the above embodiments. However, it can be appreciated by those skilled in the art that the embodiments can be further combined and arranged. Thus, the embodiments described herein are intended to cover all such changes, modifications and variants that fall within the scope of the claims as attached. Further, the term "including" as used in the description or claims has a coverage similar to that of the term "comprising" when used in the claims as a transition word. Moreover, any term "or" as used in the claims or description is to be interpreted as "or in a non-exclusive sense".

What is claimed is:

1. A scheduling system, comprising a processor coupled to a non-transitory, computer-readable medium having stored thereon at least one machine executable instruction, the at least one machine executable instruction comprising a scheduling communication module and a scheduling task generation module, wherein the at least one machine executable instruction is executed by the processor such that:
   the scheduling communication module is configured to transmit and receive information, and
   the scheduling task generation module is configured to:
   generate a container loading task and a container storage task based on a ship unloading plan;
   transmit the container loading task and the container storage task to a vehicle control system of an unmanned transportation vehicle and a warehouse management system of a warehouse center, respectively, via the scheduling communication module;
   confirm, upon receiving a ship in-position notification message from a ship control system of a target ship, an identity of a container on the target ship by comparing the identity of the container with container identification information in the ship unloading plan;
   control a shore crane apparatus to lift the container from the target ship to a lifted position, in response to the identity being confirmed;
   control the shore crane apparatus that keeps the container in the lifted position until a vehicle in-position notification message is received from the vehicle control system of the unmanned transportation vehicle; and
   in response to receiving the vehicle in-position notification message from the vehicle control system of the unmanned transportation vehicle:
   instruct the shore crane apparatus to load the container lifted in the lifted position onto the unmanned transportation vehicle, and
   mark the container in the ship unloading plan stored in a memory as in an unloaded state;
   wherein the scheduling task generation module is further configured to:
   determine, after the shore crane apparatus loads the container onto the unmanned transportation vehicle, a container unloading location based on a target container area of the container and generate a container unloading task containing the container unloading location; and
   transmit the container unloading task to the vehicle control system of the unmanned transportation vehicle via the scheduling communication module.

2. The scheduling system of claim 1, wherein a container loading location and the container unloading location are predetermined for the target container area in a port area.

3. The scheduling system of claim 2, wherein the container loading and unloading locations corresponding to the target container area in the port area is stored in advance in the scheduling system.

4. The scheduling system of claim 1, wherein when transmitting the container storage task to the warehouse management system, the scheduling system determines at least one warehouse hoisting apparatus that is in an idle state at a predetermined hoisting time.

5. The scheduling system of claim 4, wherein a state of the at least one warehouse hoisting apparatus is based on warehouse hoisting apparatus information for a port area, the warehouse hoisting apparatus information including operation time information of each of the at least one warehouse hoisting apparatus.

6. The scheduling system of claim 4, wherein the predetermined hoisting time is a ship unloading start time.

7. The scheduling system of claim 4, wherein the predetermined hoisting time is a time at which a transportation vehicle is estimated to arrive at the warehouse center.

8. The scheduling system of claim 1, wherein the scheduling system is configured to generate a plurality of container storage tasks based on the ship unloading plan.

9. The scheduling system of claim 8, wherein a port area in which the scheduling system operates comprises a plurality of warehouse management systems, and wherein the scheduling system is further configured to transmit the plurality of container storage tasks to the plurality of warehouse management systems.

10. The scheduling system of claim 1, wherein communication between the scheduling system, the warehouse management system, and the vehicle control system is by means of wireless communication.

11. The scheduling system of claim 1, wherein the scheduling system comprises a shore crane control system provided on the shore crane apparatus.

12. The scheduling system of claim 1, wherein the scheduling task generation module is further configured to:
   receive the vehicle in-position notification message from the vehicle control system of the unmanned transportation vehicle in response to the shore crane apparatus lifting the container.

13. The scheduling system of claim 1, wherein the scheduling task generation module is further configured to: determine whether all other containers in the ship unloading plan are in the unloaded state, and
   transmit a ship unloading completion notification message to the ship control system of the target ship in response to all other containers in the ship unloading plan being in the unloaded state.

* * * * *